US010289049B2

(12) United States Patent
Yoshida

(10) Patent No.: US 10,289,049 B2
(45) Date of Patent: May 14, 2019

(54) INFORMATION PROCESSING APPARATUS, METHOD OF CONTROLLING THE SAME AND STORAGE MEDIUM, THAT DISPLAYS WHEN CONSUMABLE OF PRINTING APPARATUS NEEDS TO BE REPLENISHED/REPLACED IN A TIME SEQUENCE

(71) Applicant: CANON KABUSHIKI KAISHA, Tokyo (JP)

(72) Inventor: Satoshi Yoshida, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/697,985

(22) Filed: Sep. 7, 2017

(65) Prior Publication Data
US 2018/0095398 A1 Apr. 5, 2018

(30) Foreign Application Priority Data
Sep. 30, 2016 (JP) ................................. 2016-194772

(51) Int. Cl.
G03G 15/00 (2006.01)
G06K 15/00 (2006.01)
B41J 2/00 (2006.01)
B41J 2/175 (2006.01)
B41J 29/38 (2006.01)

(52) U.S. Cl.
CPC ........ G03G 15/553 (2013.01); B41J 2/17509 (2013.01); B41J 2/17566 (2013.01); B41J 29/38 (2013.01); G03G 15/5016 (2013.01); G03G 15/556 (2013.01); G06K 15/4065 (2013.01); G06K 15/4075 (2013.01); B41J 2002/17569 (2013.01); B41J 2002/17589 (2013.01)

(58) Field of Classification Search
CPC .. G03G 15/5016; G03G 15/502; G03G 15/55; G03G 15/553; G03G 15/556; G03G 2221/1663; G06K 15/4065; G06K 15/407; G06K 15/4075; B41J 2002/17569; B41J 2002/17589
USPC .......................................... 399/24, 26, 27, 81
See application file for complete search history.

(56) References Cited

U.S. PATENT DOCUMENTS 5,729,351 A * 3/1998 Oh .......................... G06K 15/02
358/296
7,245,839 B2 * 7/2007 Nakashima .......... G03G 15/553
399/24
2014/0105620 A1 * 4/2014 Elloitt .................. G03G 15/556
399/24

FOREIGN PATENT DOCUMENTS

JP      10149065 A  *  6/1998
JP    2001180092 A  *  7/2001
JP    2008083275 A  *  4/2008
JP    2009069530 A  *  4/2009
JP    2010139768 A  *  6/2010
(Continued)

Primary Examiner — Robert B Beatty
(74) Attorney, Agent, or Firm — Rossi, Kimms & McDowell LLP

(57) ABSTRACT

First prediction data indicating a timing at which a consumable for use in a printing apparatus is to be replenished in the printing apparatus, and second prediction data indicating a timing at which a part of the printing apparatus is to be replaced, are obtained. The obtained first and second prediction data are arranged in time series on the basis of the timings indicated by the first and second prediction data. The first and second prediction data arranged in time series are displayed.

9 Claims, 14 Drawing Sheets

(56) References Cited

FOREIGN PATENT DOCUMENTS

| JP | 2012166435 A | | 9/2012 |
|----|--------------|---|--------|
| JP | 2013068765 A | * | 4/2013 |
| JP | 2013171073 A | * | 9/2013 |

* cited by examiner

FIG. 10A

| | |
|---|---|
| ⊙ NOW A4 REPLENISHMENT IS DONE | |
| 10 MIN | 4 MIN DRUM REPLACEMENT |
| 20 MIN | |
| 30 MIN | 24 MIN A3 REPLENISHMENT |
| 40 MIN | |
| 50 MIN | 44 MIN A3 REPLENISHMENT |
| 1 HR | |
| 1 HR 10 MIN | |

FIG. 10B

| | |
|---|---|
| ⊙ NOW A4 REPLENISHMENT IS DONE | |
| 10 MIN | 4 MIN DRUM REPLACEMENT |
| 20 MIN | |
| 30 MIN | |
| 40 MIN | |
| 50 MIN | |
| 1 HR | 54 MIN A3 REPLENISHMENT |
| 1 HR 10 MIN | |

FIG. 10C

① NOW DRUM REPLACEMENT IS NOT DONE, SO QUALITY CANNOT BE GUARANTEED

| 10 MIN |
| 20 MIN |
| 30 MIN |
| 40 MIN |
| 50 MIN |
| 1 HR — 54 MIN A3 REPLENISHMENT — 1015 |
| 1 HR 10 MIN |

FIG. 10D

① NOW A4 REPLENISHMENT IS DONE

| 10 MIN — 1034 |
| 20 MIN ← DRUM REPLACEMENT |
| 30 MIN    24 MIN A3 REPLENISHMENT — 1005 |
| 40 MIN |
| 50 MIN → 44 MIN A3 REPLENISHMENT — 1006 |
| 1 HR |
| 1 HR 10 MIN |

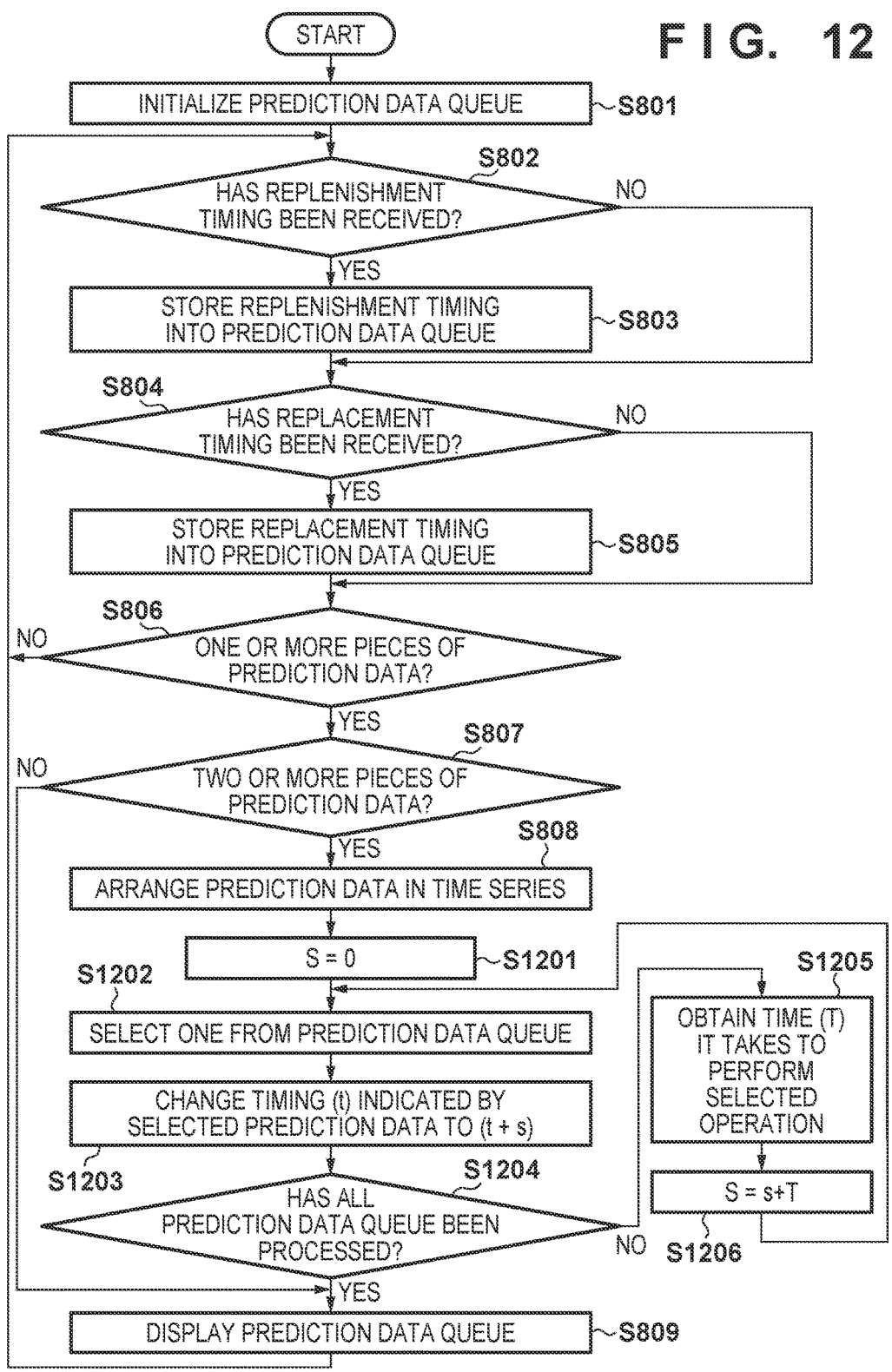

INFORMATION PROCESSING APPARATUS, METHOD OF CONTROLLING THE SAME AND STORAGE MEDIUM, THAT DISPLAYS WHEN CONSUMABLE OF PRINTING APPARATUS NEEDS TO BE REPLENISHED/REPLACED IN A TIME SEQUENCE

BACKGROUND OF THE INVENTION

Field of the Invention

The present invention relates to information processing apparatuses and methods of controlling the same, and storage medium.

Description of the Related Art

In conventional printing apparatuses equipped with a sheet feed source capable of accommodating sheets for use in printing, when sheets accommodated in the sheet feed source are exhausted during printing, a user is notified by a display, etc., and in response to this, replenishes sheets to continue printing. In this case, for example, if the user is not currently near the printing apparatus and delays replenishing sheets, the printing process is stuck, so that the efficiency of operation of the printing apparatus is reduced. To address this, for example, Japanese Patent Laid-Open No. 2012-166435 describes a technique of allowing a user to previously know when sheets are to be replenished.

According to the invention described in Japanese Patent Laid-Open No. 2012-166435, the user can previously know when the consumables, such as sheets, etc., are to be replenished. However, on printing sites, a printing process may be interrupted by other factors in addition to replenishment of consumables. For example, parts, such as a photosensitive drum, a fixing unit, etc., of a printing apparatus may need to be replaced, so that a printing process cannot be continued. In the above conventional technique, the information that is provided to the user does not include information about when such parts are to be replaced, and therefore, the user cannot previously know when the parts are to be replaced. Even if the user is allowed by any other means to know when parts are to be replaced, it is difficult for the user to know a temporal relationship between when consumables are to be replenished in a printing apparatus, and when parts are to be replaced in the printing apparatus.

SUMMARY OF THE INVENTION

An aspect of the present invention is to eliminate the above-mentioned problem with conventional technology.

A feature of the present invention is to provide a technique of allowing a user to previously know a timing at which a consumable is be replenished to a printing apparatus, and a timing at which a part is to be replaced in the printing apparatus.

According to a first aspect of the present invention, there is provided an information processing apparatus comprising: a memory device that stores a set of instructions; and at least one processor that executes the instructions to: obtain first prediction data indicating a timing at which a consumable for use in a printing apparatus is to be replenished in the printing apparatus, and second prediction data indicating a timing at which a part of the printing apparatus is to be replaced; arrange the obtained first and second prediction data in time series on the basis of the timings indicated by the first and second prediction data; and display the first and second prediction data arranged in time series.

According to a second aspect of the present invention, there is provided a method of controlling an information processing apparatus, comprising: obtaining first prediction data indicating a timing at which a consumable for use in a printing apparatus is to be replenished in the printing apparatus, and second prediction data indicating a timing at which a part of the printing apparatus is to be replaced; arranging the obtained first and second prediction data in time series on the basis of the timings indicated by the first and second prediction data; and displaying the first and second prediction data arranged in time series.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A-10D are diagrams showing example situations that prediction data related to the printing apparatus that has been displayed in an area in FIG. 9 is displayed on an operation unit by a user tapping on the area.

FIG. 12 is a flowchart for describing a control process performed by the mobile terminal according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
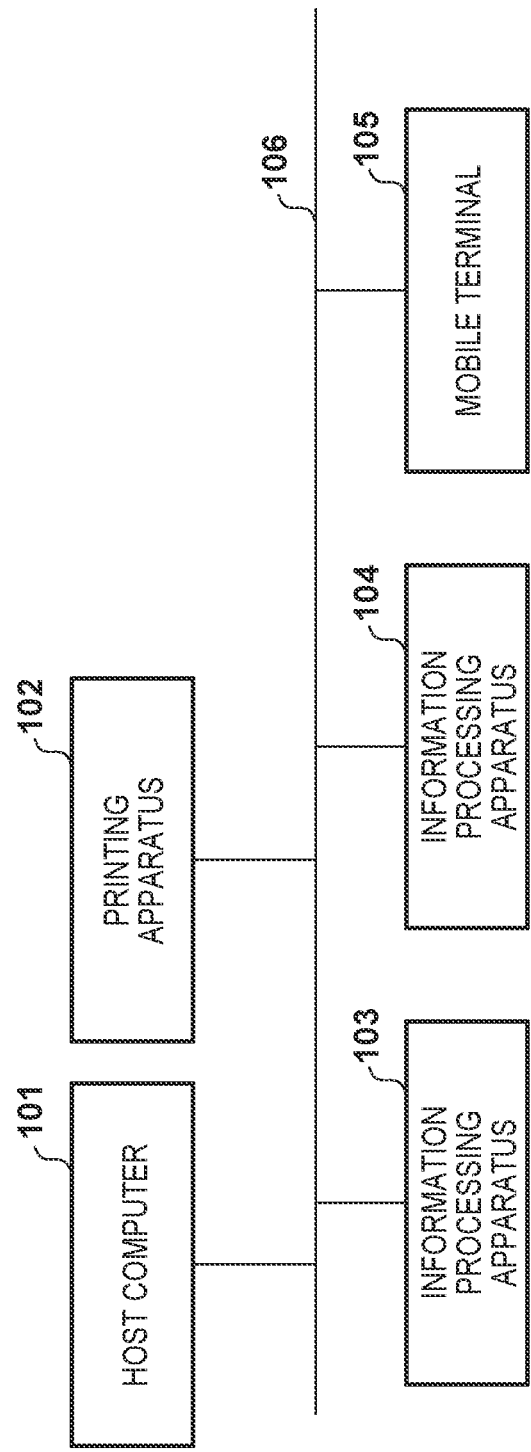
FIG. 1 is a diagram for describing a configuration of a printing system according to a first embodiment of the present invention.

FIG. 1 is a diagram for describing a configuration of a printing system according to a first embodiment of the present invention.

The printing system has a host computer 101, a printing apparatus 102, an information processing apparatus 103, an information processing apparatus 104, and a mobile terminal 105. These apparatuses are coupled together through a network 106. Note that, in the system, these apparatuses may be coupled together through a network, such as a LAN, a WAN, etc., to perform processing, as long as functions according to the present invention can be carried out. In the first embodiment, it is assumed that the information processing apparatus 103 and the information processing apparatus 104 are separated from each other. The present invention is not limited to this. For example, the information processing apparatus 103 and the information processing apparatus 104 may be integrated into a single information processing apparatus.

The host computer 101 obtains information input by a user, produces a print job to be transmitted to the printing apparatus 102, and transmits the print job to the printing apparatus 102. The printing apparatus 102 prints an image, etc., on a sheet on the basis of the received print job. The printing apparatus 102 predicts, on the basis of the received print job, timings at which items such as sheets, toner, etc., that are consumed in printing (hereinafter referred to as "consumables") are to be replenished (the timing is hereinafter referred to as "replenishment timings"). Thereafter, the printing apparatus 102 transmits the replenishment timing to the information processing apparatus 103 through the network 106. The printing apparatus 102 also has parts such as a photosensitive drum, a fixing unit, etc., that wear or are consumed for long-term use, and measures the degree of wear or consumption (hereinafter referred to as a "consumption degree") of each part using a technique described below. Thereafter, the printing apparatus 102 transmits the consumption degrees to the information processing apparatus 104 through the network 106.

The information processing apparatus 103 transmits the replenishment timings received from the printing apparatus 102 to the mobile terminal 105 through the network 106. The information processing apparatus 104 stores changes in the consumption degrees of parts over time, which are received from the printing apparatus 102, and on the basis of the changes in the consumption degrees, predicts timings at which the parts are to be replaced (hereinafter referred to as a "replacement timings"). Thereafter, the information processing apparatus 104 transmits the predicted replacement timings to the mobile terminal 105 through the network 106. The mobile terminal 105 arranges and displays the replenishment timings received from the information processing apparatus 103, and the replacement timings received from the information processing apparatus 104, in time series.

Figure 2:
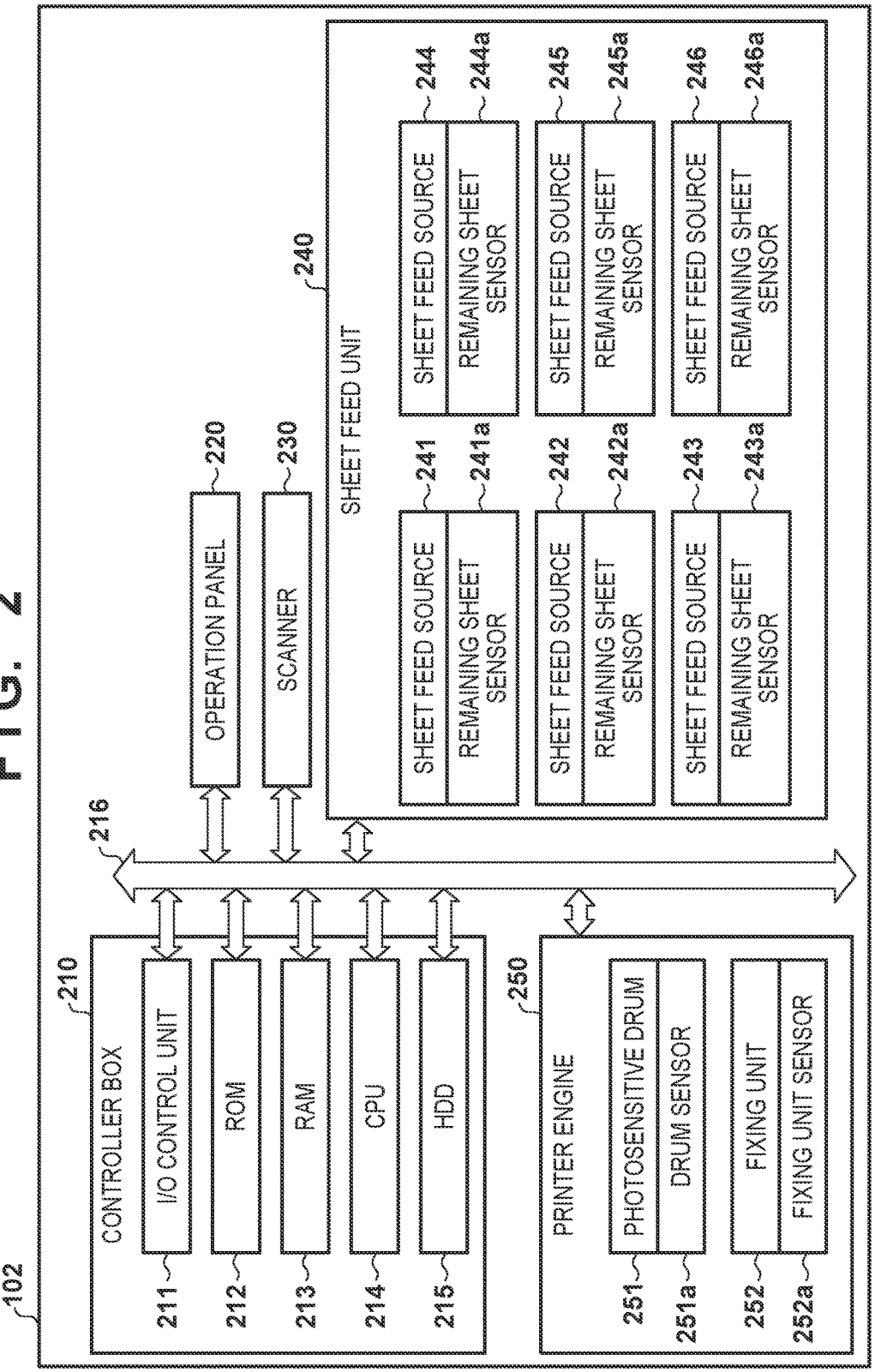
FIG. 2 is a block diagram for describing a hardware configuration of a printing apparatus according to the first embodiment.

FIG. 2 is a block diagram for describing a hardware configuration of the printing apparatus 102 according to the first embodiment.

A controller box (hereinafter referred to as a "control unit") 210 performs various data processes to control the operations of the entire printing apparatus 102. An operation panel 220 receives various operations from the user using a touchscreen scheme. A scanner 230 scans an original using an optical sensor, and obtains image data produced by the scanning. A sheet feed unit 240 has a plurality of sheet feed sources, and feeds a sheet from a designated sheet feed source to a printer engine 250. In FIG. 2, the sheet feed unit 240 has six sheet feed sources 241-246. The sheet feed sources have remaining sheet sensors 241a-246a, respectively, for detecting the amount of sheets remaining in the respective sheet feed sources. The printer engine 250 prints an image on a sheet fed from the sheet feed unit 240 in accordance with image data.

Next, a configuration of the control unit 210 will be described.

An input/output (I/O) control unit 211 controls communication with the network. A ROM 212 stores various control programs that are executed by a CPU 214. A RAM 213 provides a memory area in which a program read from the ROM 212 is deployed, and is also used as a work area during execution of a program by the CPU 214. The CPU 214 executes programs deployed in the RAM 213 to perform various controls described below. An HDD 215, which is a hard disk drive, is used to store a large amount of data, such as image data, print data, etc., temporarily or permanently. These components are coupled together through a system bus 216. Furthermore, the system bus 216 couples the control unit 210 with each device in the printing apparatus 102. Note that a control program and an operating system may be stored in the HDD 215 in addition to the ROM 212.

The sheet feed unit 240 has a plurality of sheet feed sources including sheet feed sources provided in the main body of the printing apparatus 102, and other sheet feed sources, such as an optional external sheet feed source and a manual sheet feed source (manual feed tray). Each sheet feed source can separate or pick up the uppermost sheet from sheets accommodated therein, and feed that sheet toward the printer engine 250.

The printer engine 250 has a photosensitive drum 251 and a fixing unit 252. The surface of the photosensitive drum 251 is electrostatically charged by a high voltage using a charger, and is then irradiated with laser light corresponding to an image signal, so that an electrostatic latent image is formed on the surface. Thereafter, toner supplied from a developer is applied and sticks to the surface to develop the electrostatic latent image. The resulting toner image is transferred onto a sheet. Thereafter, the toner image is fixed to the sheet by the fixing unit 252. Toner left on the surface of the photosensitive drum 251 is removed using a blade. Thus, the high voltage, laser irradiation, cleaning by the blade, etc., exert stress on the photosensitive drum 251 during printing, and therefore, the photosensitive drum 251 wears or is consumed each time printing is performed. A drum sensor 251a is used to measure the consumption degree of the photosensitive drum 251. The fixing unit 252 is controlled by the control unit 210. The fixing unit 252 includes a pressing roller and a heating roller, which are rotated to transport a sheet having a transferred toner image while the toner image is fixed to the sheet by heat and pressure. Thus, the fixing unit 252 is heated to high temperature, and undergoes frictions caused by rotation, sheet transport, etc., during printing. Therefore, the fixing unit 252 wears or is consumed each time printing is performed. A fixing unit sensor 252a is used to measure the consumption degree of the fixing unit 252.

Figure 3:
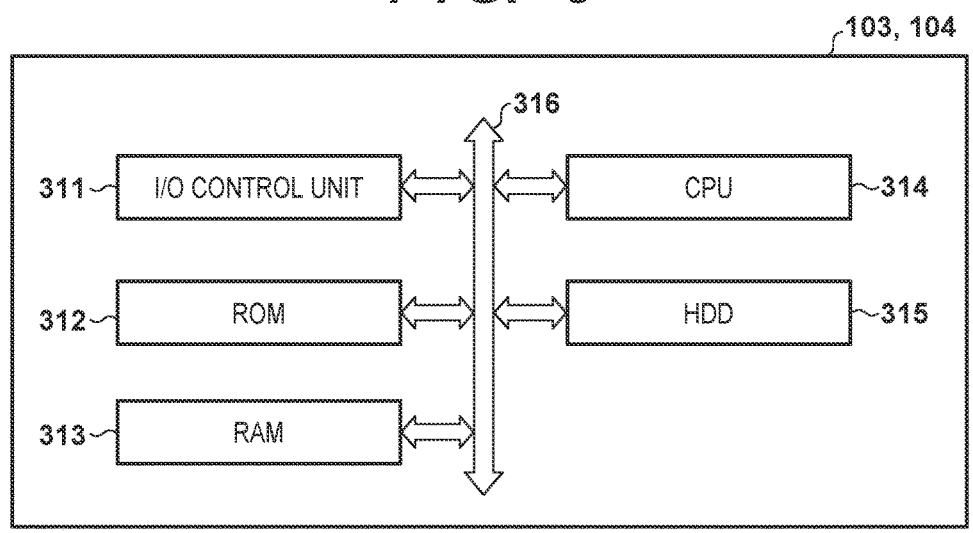
FIG. 3 is a block diagram for describing a hardware configuration of an information processing apparatus according to the first embodiment.

FIG. 3 is a block diagram for describing a hardware configuration of the information processing apparatuses 103 and 104 according to the first embodiment. Note that, here, the information processing apparatuses 103 and 104 have the same hardware configuration, and therefore, the information processing apparatus 103 will here be described as an example.

An I/O control unit 311 controls communication with the network. A ROM 312 stores a boot program. When the information processing apparatus 103 is turned on, a CPU 314 executes the boot program stored in the ROM 312 to read and deploy an OS and a program installed in an HDD 315 into a RAM 313. Thereafter, the CPU 314 executes the program deployed in the RAM 313 to control an operation of the information processing apparatus 103. The HDD 315 stores various programs, an OS, a large amount of data, etc. These components are coupled together through a system bus 316. Note that the RAM 313 also functions as a main memory and a work memory for the CPU 314.

Figure 4:
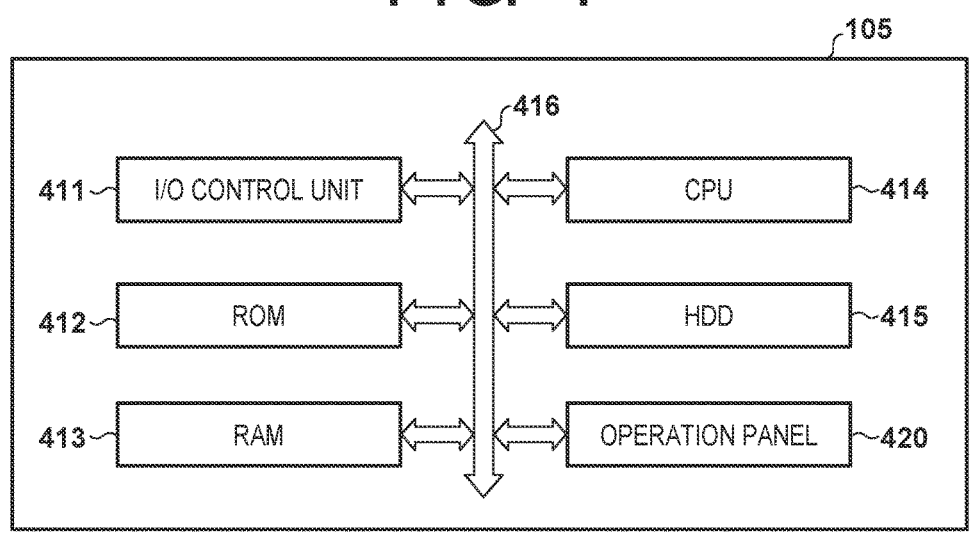
FIG. 4 is a block diagram for describing a hardware configuration of a mobile terminal according to the first embodiment.

FIG. 4 is a block diagram for describing a hardware configuration of the mobile terminal 105 according to the first embodiment.

An I/O control unit 411 controls data exchange with an operation panel 420, and communication with the network. A ROM 412 stores a boot program. When the mobile terminal 105 is turned on, a CPU 414 executes the boot program stored in the ROM 412 to read and deploy an OS and a program installed in an HDD 415 into a RAM 413. Thereafter, the CPU 414 executes the program deployed in the RAM 413 to control an operation of the mobile terminal 105. The HDD 415 stores various programs, an OS, a large amount of data, etc. The operation panel 420 receives various operations from the user using a touchscreen scheme. These components are coupled together through a system bus 416. Note that the RAM 413 also functions as a main memory and a work memory for the CPU 414.

Figure 5:
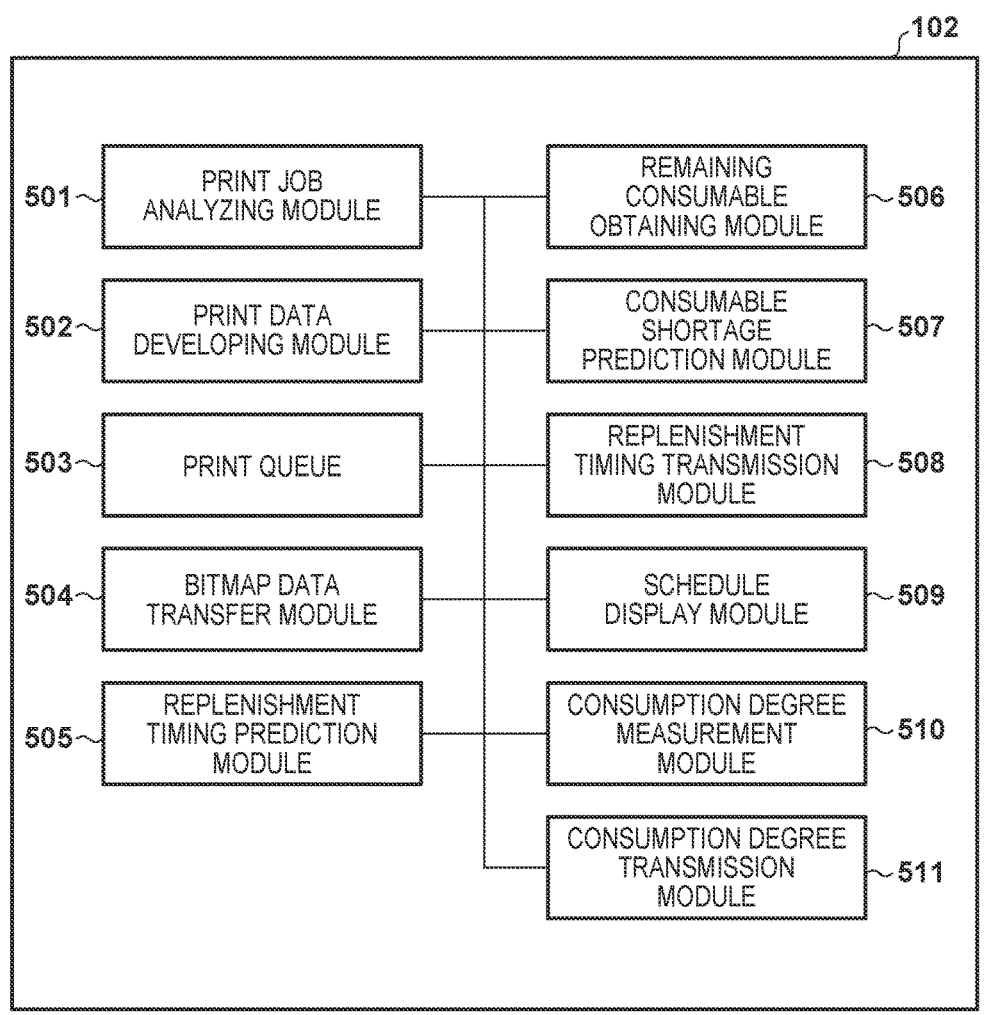
FIG. 5 is a functional block diagram for describing software modules of the printing apparatus according to the first embodiment.

FIG. 5 is a functional block diagram for describing software modules of the printing apparatus 102 according to the first embodiment. Note that the functions of these software modules are implemented by the CPU 214 of the control unit 210 executing a program deployed in the RAM 213.

A print job analyzing module 501 analyzes various print jobs received by the printing apparatus 102, such as a print job received from the host computer 101, a copy job generated by the printing apparatus 102, etc., to read out print settings contained in the print jobs. Here, print settings mainly include, for example, information about sheets such as the size and type of sheets to be used in printing, a sheet feed source, etc., and information about finishing processes, such as single-sided printing, double-sided printing, stapling, book binding, etc. The print settings read out by the print job analyzing module 501 are temporarily stored in the RAM 213, the HDD 215, etc. A print data developing module 502 develops image data contained in various print jobs received by the printing apparatus 102, into bitmap data that can be printed by the printer engine 250. Image data contained in a print job received from the host computer 101 is typically described in a page description language (PDL), etc. Therefore, a process of developing the PDL data into bitmap data is performed. Note that, here, if image data is previously developed into bitmap data by the host computer 101, etc., the print data developing module 502 performs a color conversion process of converting the image data into a color space supported by the printer engine 250. In the case of a copy job generated by the printing apparatus 102, the print data developing module 502 develops image data obtained by the scanner 230 into bitmap data. Bitmap data thus generated by the print data developing module 502 is temporarily stored in a storage apparatus, such as the HDD 215, etc.

All print jobs received by the printing apparatus 102 are processed by the print job analyzing module 501 and the print data developing module 502, and the resulting information is sent to a print queue 503, which manages the information in a centralized manner. The print queue 503 controls the order in which the managed print jobs are printed, in such a manner that a print process is performed in a predetermined order. A print job for which printing has been ended is removed from the print queue 503. A bitmap data transfer module 504 transfers bitmap data generated by the print data developing module 502 to the printer engine 250 at a timing that is matched to a timing at which a sheet is transported from the sheet feed unit 240 to the printer engine 250.

A replenishment timing prediction module 505 predicts the replenishment timings of consumables such as toner, sheets, etc. The replenishment timing prediction is performed using the print settings of print jobs read out by the print job analyzing module 501, the amounts of remaining consumables obtained by a remaining consumable obtaining module 506, and the processing performance of the printer engine 250. Here, the processing performance of the printer engine 250 is determined on the basis of the rate of printing, the processing time it takes to switch between sheet sizes or sheet types, the processing times it takes to adjust and clean the engine, the time it takes to perform a finishing process, etc. The remaining consumable obtaining module 506 communicates with the sheet feed unit 240 to obtain information such as a sheet size, a sheet type, the number of remaining sheets, etc., that is set in each sheet feed source. The information thus obtained is temporarily stored in a storage apparatus, such as the RAM 213, the HDD 215, etc. A consumable shortage prediction module 507 predicts whether or not an out-of-sheets situation where there is a shortage of sheets for a print job, i.e., sheets are exhausted before completion of the print job, will occur for each size or type of sheets that are used in print jobs accumulated in the print queue 503. The determination of whether or not an out-of-sheets situation will occur is performed by comparing the number of sheets that are to be used in print jobs accumulated in the print queue 503 with the number of remaining sheets that has been obtained by the remaining consumable obtaining module 506. If the consumable shortage prediction module 507 has determined that an out-of-sheets situation will occur during execution of a print job, the replenishment timing prediction module 505 is used to predict a timing at which the out-of-sheets situation will occur. Each time the replenishment timing predicted by the replenishment timing prediction module 505 is updated, a replenishment timing transmission module 508 transmits the updated replenishment timing to the information processing apparatus 103.

A schedule display module 509 displays a schedule screen on the operation panel 220. The schedule screen displays the order in which and the timings at which print jobs accumulated in the print queue 503 are to be printed.

A consumption degree measurement module 510 measures the consumption degrees of the photosensitive drum 251 and the fixing unit 252. It is known that the consumption degree of the photosensitive drum 251, which indicates how much the photosensitive drum 251 has worn or been consumed, compared to when it is brand-new, can be calculated on the basis of DC current amounts measured at one or more portions of the photosensitive drum 251. The DC current amounts of one or more portions of the photosensitive drum 251 are measured using one or more sensors included in the drum sensor 251a. The consumption degree obtained from the DC current amounts measured by the drum sensor 251a is referred to as a "photosensitive drum consumption degree." The consumption degree that serves as a guide value for part replacement is determined, during designing of a photosensitive drum and a printing apparatus, on the basis of a DC current amount as measured when it is determined that the frequency of error and the quality of a printed image are not acceptable (i.e., higher or lower than a respective predetermined level) due to a deterioration in the photosensitive drum after long-term use. Note that the consumption degree is normalized in such a manner that the value of the consumption degree as measured when the photosensitive drum is brand-new is "0," and the value of the consumption degree that has just reached the guide value for part replacement is "100."

It is known that the consumption degree of the fixing unit 252, which indicates how much the fixing unit 252 has worn or been consumed, compared to when it is brand-new, can be calculated on the basis of surface friction degrees measured at one or more portions of the fixing unit 252, and the temperature during printing and the traveling distance of a printed sheet. The surface friction degrees of one or more portions of the fixing unit 252 are measured using one or more sensors included in the fixing unit sensor 252a. The consumption degree obtained from the surface friction degrees measured by the fixing unit sensor 252a is referred to as a "fixing unit consumption degree." The consumption degree that serves as a guide value for part replacement is determined, during designing of a fixing unit and a printing apparatus, on the basis of the surface friction degree as measured when it is determined that the frequency of error and the quality of a printed image are not acceptable (i.e., higher or lower than a respective predetermined level) due to a deterioration in the fixing unit after long-term use. Note that the consumption degree is normalized in such a manner that the value of the consumption degree as measured when the fixing unit is brand-new is "0," and the value of the consumption degree that has just reached the guide value for part replacement is "100." A consumption degree transmission module 511 transmits a consumption degree measured by the consumption degree measurement module 510 to the information processing apparatus 104 at predetermined time intervals.

Although sheets have been described as an example consumable, the present invention is applicable to other consumables, such as toner, staples, etc., if the remaining amount thereof can be detected. In addition to the photosensitive drum 251 and the fixing unit 252, the printing apparatus 102 includes a plurality of other parts that wear or are consumed for long-term use and then need to be replaced. The present invention is applicable to these parts, if the conditions of the parts can be detected and the consumption degrees thereof can be calculated like the drum sensor 251a or the fixing unit sensor 252a.

Figure 6A:
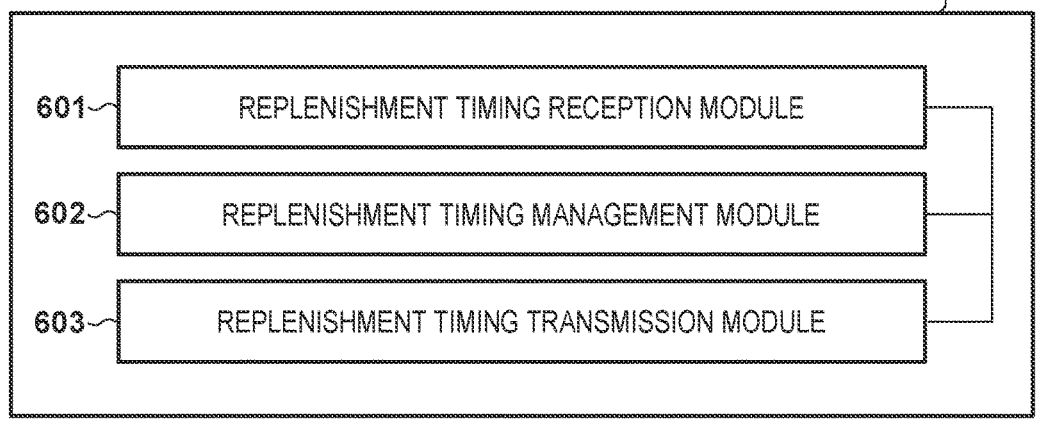
FIGS. 6A and 6B are functional block diagrams for describing software modules of the information processing apparatus according to the first embodiment.
Figure 6B:
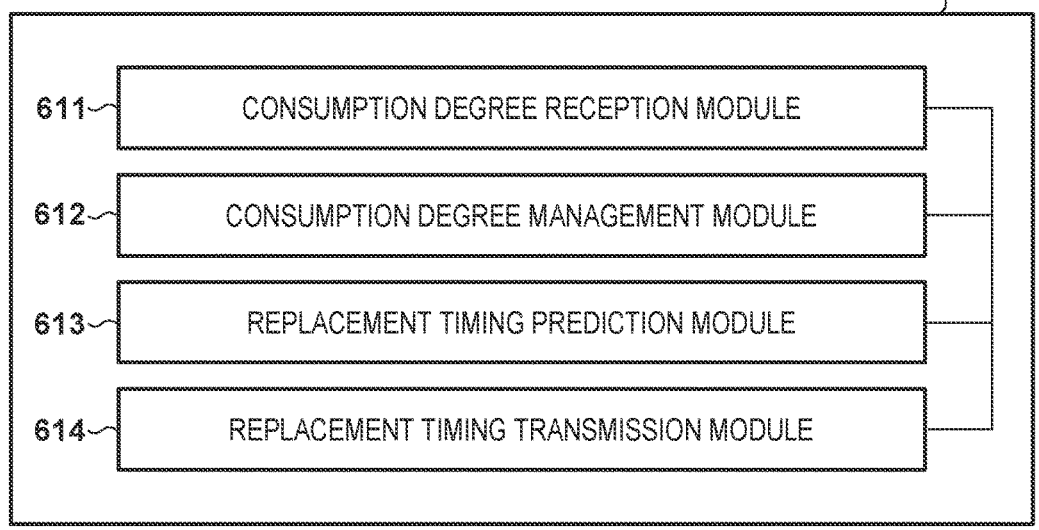

FIGS. 6A and 6B are functional block diagrams for describing software modules of the information processing apparatuses 103 and 104, respectively, according to the first embodiment.

FIG. 6A is a functional block diagram for describing software modules of the information processing apparatus 103 according to the first embodiment. Note that the functions of these software modules are implemented by the CPU 314 of the information processing apparatus 103 executing a program deployed in the RAM 313.

A replenishment timing reception module 601 receives the replenishment timing of a consumable that is transmitted from the printing apparatus 102. A replenishment timing management module 602 stores and manages the replenishment timing received by the replenishment timing reception module 601, in a storage apparatus, such as the RAM 313, the HDD 315, etc. A replenishment timing transmission module 603 transmits a replenishment timing received by the replenishment timing reception module 601, to the mobile terminal 105.

FIG. 6B is a functional block diagram for describing software modules of the information processing apparatus 104 according to the first embodiment. Note that the functions of these software modules are implemented by the CPU 314 of the information processing apparatus 104 executing a program deployed in the RAM 313.

A consumption degree reception module 611 receives the consumption degree of a part that is transmitted from the printing apparatus 102. A consumption degree management module 612 stores and manages the consumption degree received by the consumption degree reception module 611, together with the timing of the reception, in a storage apparatus, such as the RAM 313, the HDD 315, etc. A replacement timing prediction module 613 statistically processes the consumption degree of the part of the printing apparatus 102 that is managed by the consumption degree management module 612, to predict a timing at which the consumption degree will reach "100" that is a guide value for part replacement. Thereafter, the replacement timing prediction module 613 temporarily stores the predicted timing as a predicted replacement timing of the part, in a storage apparatus, such as the RAM 313, the HDD 315, etc. Each time the timing predicted by the replacement timing prediction module 613 is updated, a replacement timing transmission module 614 transmits the updated predicted replacement timing to the mobile terminal 105.

Figure 7:
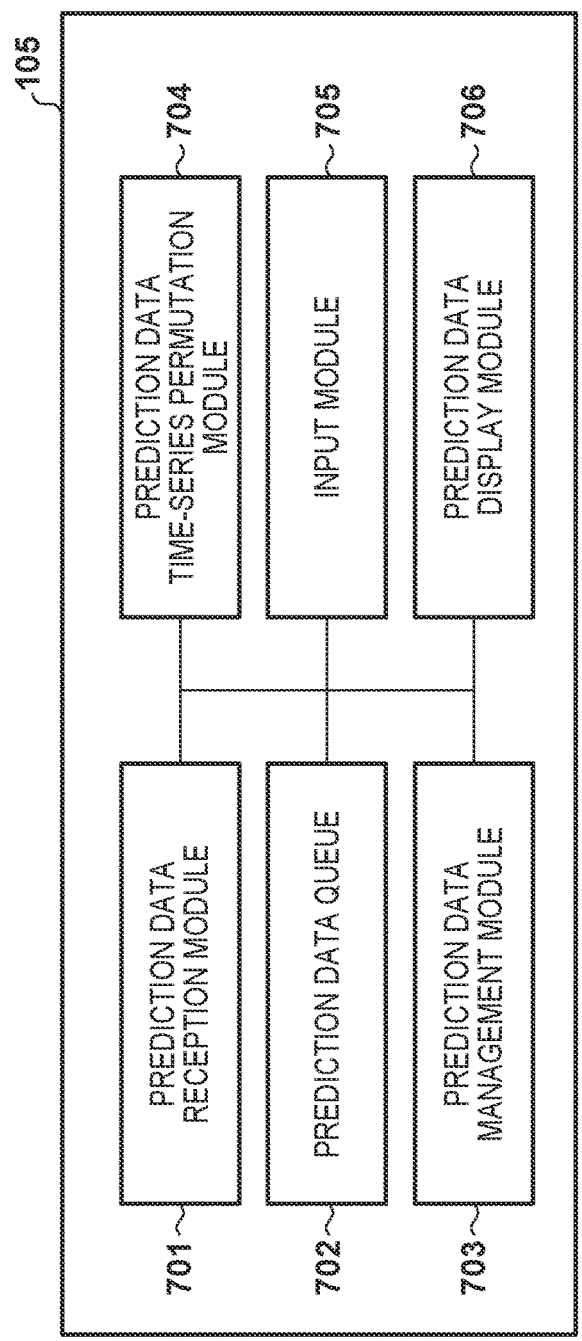
FIG. 7 is a functional block diagram for describing software modules of the mobile terminal according to the first embodiment.

FIG. 7 is a functional block diagram for describing software modules of the mobile terminal 105 according to the first embodiment. Note that the functions of these software modules are implemented by the CPU 414 of the mobile terminal 105 executing a program deployed in the RAM 413.

A prediction data reception module 701 receives a replenishment timing transmitted from the information processing apparatus 103, and a replacement timing transmitted from the information processing apparatus 104. A prediction data queue 702 stores prediction data such as a replenishment timing and a replacement timing received by the prediction data reception module 701, etc. A prediction data management module 703 performs processes such as adding and deleting prediction data such as a replenishment timing and a replacement timing received by the prediction data reception module 701, etc., to and from the prediction data queue 702, etc. The prediction data management module 703 references and compares prediction data stored in the prediction data queue 702. A prediction data time-series permutation module 704 arranges prediction data stored in the prediction data queue 702 in time series. An input module 705 receives an instruction via the operation panel 420 from the user. A prediction data display module 706 displays prediction data on the operation panel 420. Here, prediction data that is displayed refers to replenishment timings and replacement timings that have been arranged in time series by the prediction data time-series permutation module 704 and are stored in the prediction data queue 702. Example screens displayed by the prediction data display module 706 are described below with reference to FIGS. 9 and 10A-10D.

Figure 8:
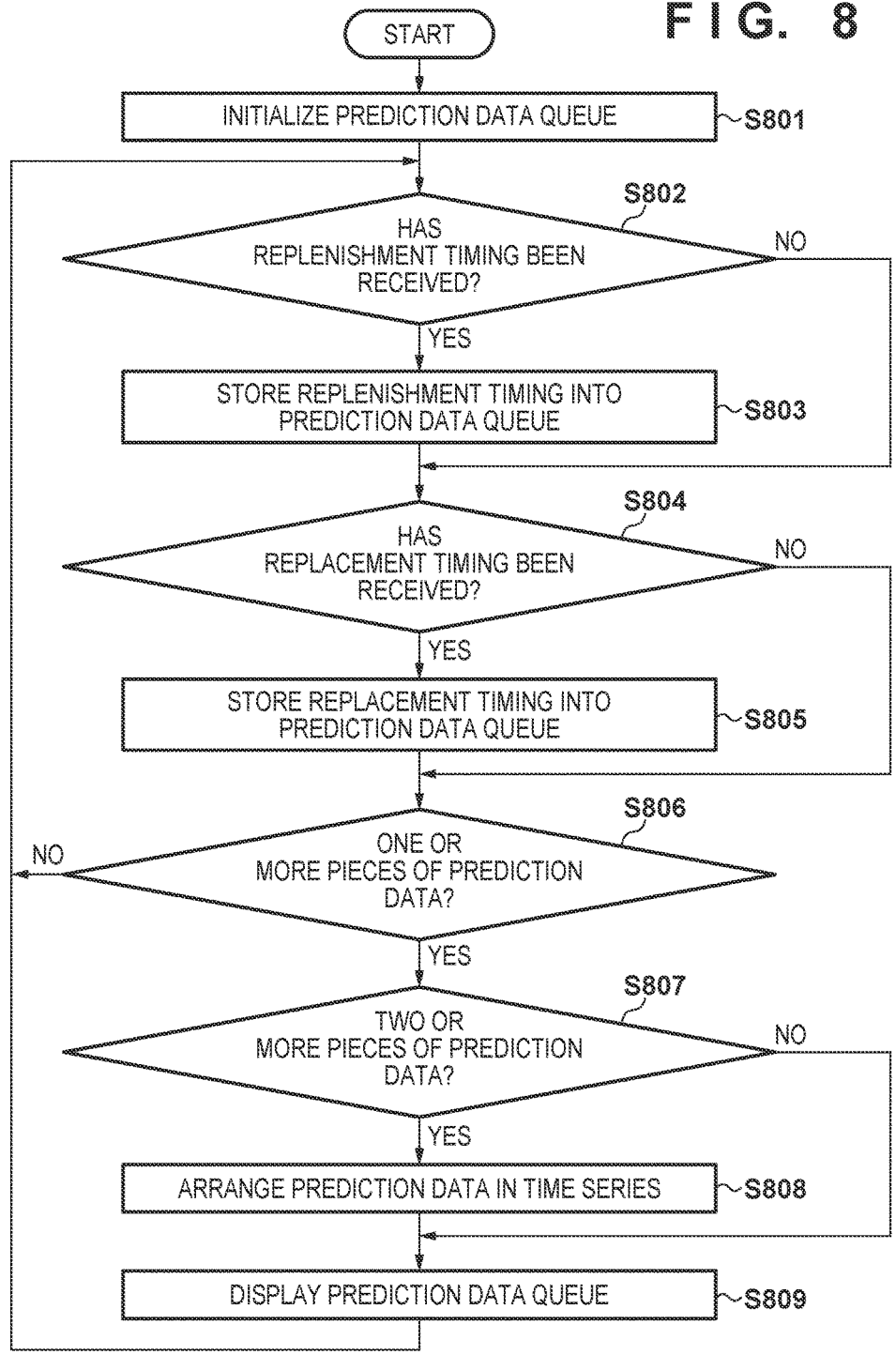
FIG. 8 is a flowchart for describing a control process performed by the mobile terminal according to the first embodiment.

FIG. 8 is a flowchart for describing a control process performed by the mobile terminal 105 according to the first embodiment. Note that this process is implemented by the CPU 414 of the mobile terminal 105 executing a program deployed in the RAM 413.

This process is started by starting a prediction data display application installed in the mobile terminal 105. Initially, in step S801, the CPU 414 functions as the prediction data management module 703 to delete all prediction data stored in the prediction data queue 702 and thereby initialize the prediction data queue 702. Next, the processing proceeds to step S802, in which the CPU 414 functions as the prediction data reception module 701 to determine whether or not a replenishment timing has been received from the information processing apparatus 103. Here, if the determination result is positive (YES in step S802), the processing proceeds to step S803. Otherwise (NO in step S802), the processing proceeds to step S804. In step S803, the CPU 414 functions as the prediction data management module 703 to store the replenishment timing received in step S802 into the prediction data queue 702, and the processing proceeds to step S804.

In step S804, the CPU 414 functions as the prediction data reception module 701 to determine whether or not a replacement timing has been received from the information processing apparatus 104. Here, if the determination result is positive (YES in step S804), the processing proceeds to step S805. Otherwise (NO in step S804), the processing proceeds to step S806. In step S805, the CPU 414 functions as the prediction data management module 703 to store the replacement timing received in step S804 into the prediction data queue 702, and the processing proceeds to step S806.

In step S806, the CPU 414 functions as the prediction data management module 703 to determine whether or not at least one piece of prediction data is stored in the prediction data queue 702. Here, if the determination result is negative (NO in step S806: it has been determined that less than one piece of prediction data is stored in the prediction data queue 702), the processing proceeds to step S802 without execution of the prediction data permutation process and the prediction data display process. Otherwise (YES in step S806: it has been determined that at least one piece of prediction data is stored in the prediction data queue 702), the processing proceeds to step S807. In step S807, the CPU 414 functions as the prediction data management module 703 to determine whether or not at least two pieces of prediction data are stored in the prediction data queue 702. Here, if the determination result is negative (NO in step S807: it has been determined that less than two pieces of prediction data are stored in the prediction data queue 702), the processing proceeds to step S809 without execution of the prediction data permutation process. Otherwise (YES in step S807: it has been determined that at least two pieces of prediction data are stored in the prediction data queue 702), the processing proceeds to step S808.

In step S808, the CPU 414 functions as the prediction data time-series permutation module 704 to arrange prediction data stored in the prediction data queue 702 in time series. In the first embodiment, predicted replenishment timings and predicted replacement timings stored in the prediction data queue 702 are arranged in order of closeness to the current time with the closest first. Thereafter, the processing proceeds to step S809, in which the CPU 414 functions as the prediction data display module 706 to display the prediction data stored in the prediction data queue 702 on the operation panel 420. Thereafter, when step S809 ends, the processing proceeds to step S802. The above series of processes are repeated.

Note that, in the above embodiment, replenishment timings received from the information processing apparatus 103, and replacement timings received from the information processing apparatus 104, are directly used by the mobile terminal 105. The present invention is not limited to this. For example, the mobile terminal 105 may predict consumable replenishment timings on the basis of received replenishment timings, and display the predicted consumable replenishment timings in time series. The mobile terminal 105 may also predict part replacement timings on the basis of received part replacement timings, and display the predicted part replacement timings in time series.

For example, if the unit of predicted replacement timings received from the information processing apparatus 104 is the hour, the mobile terminal 105 may predict replacement timings with accuracy to the minute. The mobile terminal 105 may also calculate a timing at which a part is to be replaced, with accuracy to the minute, on the basis of the replacement information of the part received from the information processing apparatus 104 and the consumption degree of the part received from the printing apparatus 102. Similarly, the mobile terminal 105 may predict again a timing at which a consumable is to be replenished, on the basis of the replenishment timing of the consumable received from the information processing apparatus 103 and the remaining amount of the consumable received from the printing apparatus 102.

Alternatively, the mobile terminal 105 may display and present, to the user, a replacement timing received from the information processing apparatus 104 using the prediction data display module 706, and allow the user to input a timing (or a date) at which a part will be actually replaced.

Thus, the process of FIG. 8 may be executed in such a manner that a replenishment timing or replacement timing that is predicted again by the mobile terminal 105, or a replacement timing that is input by the user and is obtained by the mobile terminal 105, is stored in the prediction data queue 702.

Figure 9:
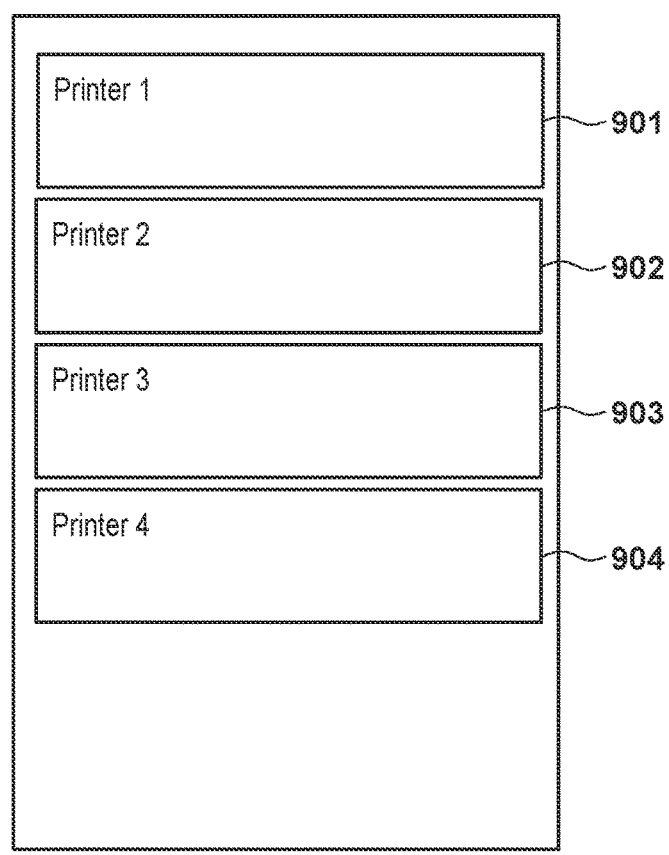
FIG. 9 is a diagram showing an example screen displayed on an operation panel by the mobile terminal according to the first embodiment.

FIG. 9 is a diagram showing an example screen displayed on the operation panel 420 by the prediction data display module 706 of the mobile terminal 105 according to the first embodiment.

FIG. 9 shows an entire interface screen displayed on the operation panel 420. The screen displays a list of the names of printing apparatuses coupled through the network 106. Note that, in the first embodiment, it is assumed that the names of printing apparatuses can be arbitrarily set. In FIG. 9, as shown in areas 901-904, the mobile terminal 105 is coupled to four printing apparatuses. Here, when the user of the mobile terminal 105 taps on one of the areas 901-904, prediction data related to the tapped printing apparatus can be displayed as shown in, for example, FIGS. 10A-10D.

FIG. 10A shows a situation that prediction data related to a printing apparatus (printer 1) that has been displayed in the area 901 in FIG. 9 is displayed on the operation panel 420 by the user tapping on the area 901. Note that the display shown in FIGS. 10A-10D is merely for illustrative purposes, and the present invention is not limited to this. Any display that allows the user to recognize a temporal relationship between consumable replenishment timings and part replacement timings, can be used.

In FIGS. 10A-10D, each row is an area for displaying a consumable replenishment operation or a part replacement operation that has been performed or is to be performed at a predetermined timing in a printing apparatus (printer 1). Here, the current state is displayed in the uppermost row. For example, in FIG. 10A, a message that A4-size sheets has been replenished, is displayed. In the second and following rows, a period of time that will have elapsed since the current time is displayed. In addition, in each of these rows, a consumable replenishment operation or a part replacement operation that is expected during that displayed time slot, if any, is displayed. In FIG. 10A, in rows 1005 and 1006, a predicted timing at which A3-size sheets are to be replenished is displayed, and in a row 1004, a predicted timing at which the photosensitive drum is to be replaced is displayed. By referencing these displays, the user can previously know what and when to replenish or replace. Here, in the row 1004, a prediction that the drum is to be replaced four minutes later is displayed. In the rows 1005 and 1006, predictions that A3 sheets are to be replenished 24 minutes later and 44 minutes later, respectively, are displayed.

As described above, according to the first embodiment, predicted timings at which consumables are to be replenished in a printing apparatus, and predicted timings at which parts is to be replaced in the printing apparatus, can be displayed in time series. As a result, the user can know a time series of timings at which consumables are to be replenished in a printing apparatus, and predicted timings at which parts are to be replaced in the printing apparatus. Therefore, the user can make a more accurate operation schedule for the printing apparatus.

Second Embodiment

In the first embodiment, in step S809 of FIG. 8, prediction data containing replenishment timings and replacement timings arranged in time series is displayed on the operation panel 420 and presented to the user. In this case, however, the prediction data is generated without taking into consideration times it takes to replenish consumables and replace parts, and therefore, a replenishment operation or a replacement operation is not always performed exactly at the presented time.

With this in mind, in the second embodiment, an example will be described in which the prediction data is corrected, taking into consideration times it takes to replenish consumables and replace parts of a printing apparatus. Note that, in the second embodiment, only portions in which it is different from the first embodiment are described, and the same portions are indicated by the same reference characters and will not be described. The configuration of a printing system according to the second embodiment and the software modules of a printing apparatus, etc., according to the second embodiment are similar to those of the first embodiment, and therefore, will not be described.

Figure 11:
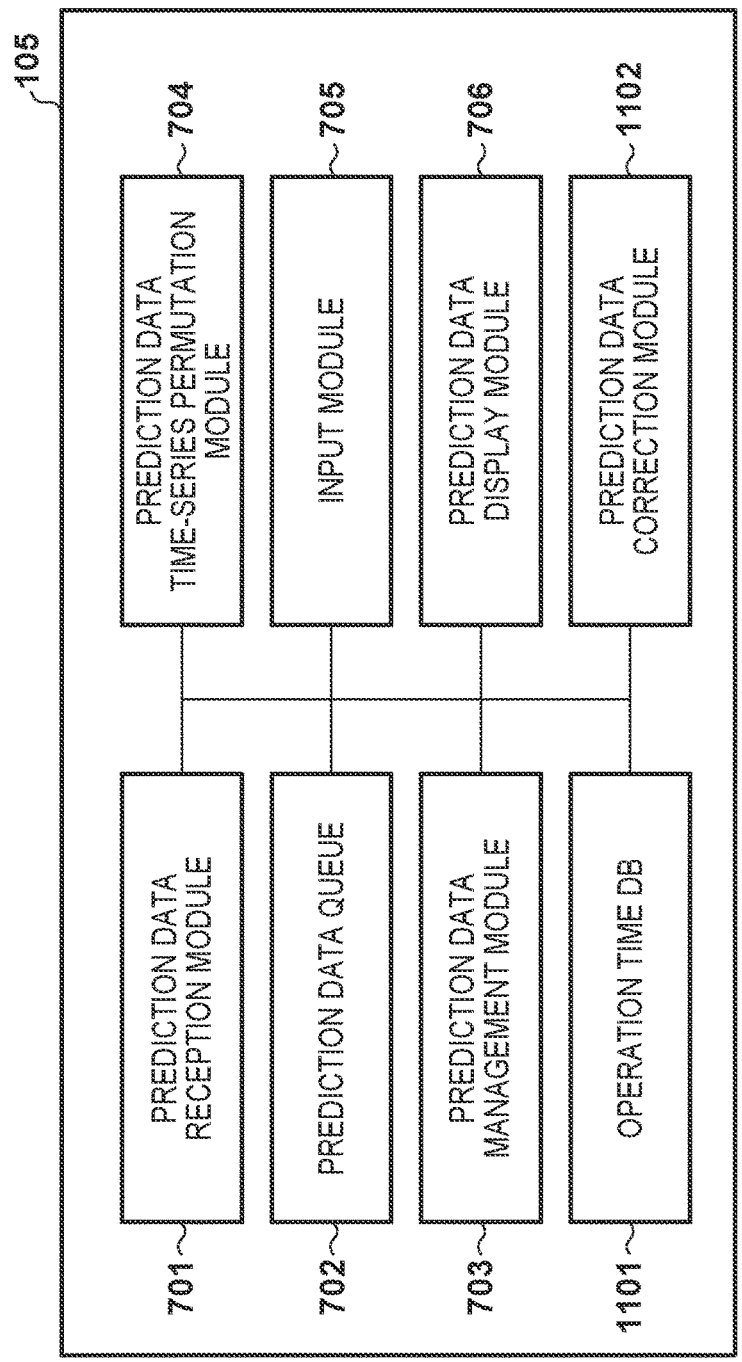
FIG. 11 is a functional block diagram for describing software modules of a mobile terminal according to a second embodiment of the present invention.

FIG. 11 is a functional block diagram for describing software modules of a mobile terminal 105 according to the second embodiment of the present invention. Note that the functions of these software modules are implemented by a CPU 414 of the mobile terminal 105 executing a program deployed in a RAM 413. In FIG. 11, the same components as those of FIG. 7 are indicated by the same reference characters and will not be described. In FIG. 11, in addition to the components described with reference to FIG. 7, an operation time database (DB) 1101 and a prediction data correction module 1102.

The operation time DB 1101 stores information about times (time periods) it takes to replenish consumables and replace parts. In the second embodiment, it is assumed that the user previously stores, in the operation time DB 1101, the information about times it takes to replenish consumables and replace parts. The prediction data correction module 1102 corrects replenishment timings and replacement timings stored in the prediction data queue 702, on the basis of the information about times it takes to replenish consumables and replace parts.

FIG. 12 is a flowchart for describing a control process performed by the mobile terminal 105 according to the second embodiment. Note that this process is implemented by the CPU 414 of the mobile terminal 105 executing a program deployed in the RAM 413. In FIG. 12, steps similar to those of FIG. 8 are indicated by the same reference characters and will not be described.

In FIG. 12, when step S808 is executed, the processing proceeds to step S1201, in which the CPU 414 initializes a variable S that stores the sum of times it takes to perform operations, to "0." The variable S is stored in the RAM 413. Next, the processing proceeds to step S1202, in which the CPU 414 functions as the prediction data management module 703 to select a piece of prediction data from the prediction data queue 702 sequentially from the leading data. Next, the processing proceeds to step S1203, in which the CPU 414 functions as the prediction data correction module 1102 to change a time (t) contained in the prediction data selected in step S1202 to (S+t). In the example of FIG. 10B, when the leading prediction data, indicating drum replacement, is selected in step S1202, S is "0" and therefore a predicted timing for drum replacement remains unchanged, i.e., is four minutes. Next, the processing proceeds to step S1204, in which the CPU 414 functions as the prediction data management module 703 to determine whether or not all prediction data stored in the prediction data queue 702 has been corrected. If the determination result is negative (NO in step S1204), the processing proceeds to step S1205. Otherwise (YES in step S1204), the processing proceeds to step S809. In step S1205, the CPU 414 functions as the prediction data management module 703 to obtain information (T) about a time it takes to perform the operation selected in step S1202, from the operation time DB 1101. Next, the processing proceeds to step S1206, in which the CPU 414 adds the information (T) about a time it takes to replenish a consumable or replace a part, which has been obtained in step S1205, to S, and the processing proceeds to step S1202. As a result, the information (T) about a time it takes to perform the operation is to be added to a timing indicated by prediction data that is next selected, in step S1203.

FIG. 10B is a diagram showing an example screen displayed on the operation panel 420 by the prediction data display module 706 according to the second embodiment. FIG. 10B shows an example in which a prediction time is changed, taking into consideration information about times it takes to replenish consumables and replace parts, compared to the prediction data of FIG. 10A. Here, the same portions as those of FIG. 10A are indicated by the same reference characters and will not be described.

In FIG. 10A, an operation to replace the photosensitive drum 251 is predicted to be performed 4 minutes later, and an operation to replenish A3 sheets is predicted to be performed 24 minutes later. Here, it is assumed that it takes 30 minutes for the user to replace the photosensitive drum 251. The time it takes to perform this operation is stored as information about a time it takes to replace the photosensitive drum 251, in the operation time DB 1101.

Here, a description will be given with reference to the flowchart of FIG. 12. If the prediction data management module 703 selects prediction data indicating drum replacement in the row 1004 of FIG. 10B in step S1202, "30 minutes" is obtained as information about a time it takes to replace the photosensitive drum 251, from the operation time DB 1101 in step S1205. Thereafter, in step S1206, the time information (30 minutes) is stored into S. Next, when, in step S1202, prediction data indicating the replenishment of A3 sheets in the row 1005 of FIG. 10A is selected, the processing proceeds to step S1203, in which the CPU 414 adds, to the timing of the replenishment of A3 sheets indicated by the prediction data, the information about the time (30 minutes) it takes to replace the photosensitive drum 251, which has been updated in step S1206. As a result, as shown in a row 1015 in FIG. 10B, a predicted timing at which an operation to replenish A3 sheets is to be performed is changed from "24 minutes" to "54 minutes."

As described above, according to the second embodiment, predicted timings are determined, taking into consideration times it takes to replenish consumables and replace parts of a printing apparatus. Therefore, the user can know more actual predicted timings of operations, and make a more accurate operation schedule for the printing apparatus.

Third Embodiment

In the second embodiment, more accurate replenishment timings and replacement timings are presented to the user by determining prediction data, taking into consideration information about times it takes to replenish consumables or replace parts. However, despite the presentation of predicted timings, some users continue to use a printing apparatus without replacing parts past such a guide timing for part replacement. In some cases, the user does not have spare parts on hand, and cannot replace parts.

With this in mind, in a third embodiment, when an operation to replace a part is not performed at a predicted timing, the user's attention is drawn to this or the user is notified. Note that, in the third embodiment, only portions in which it is different from the second embodiment will be described. The same components as those of the second embodiment are indicated by the same reference characters and will not be described. The configuration of a printing system according to the third embodiment and the configurations of a printing apparatus, etc., according to the third embodiment are similar to those of the above embodiments, and therefore, will not be described.

Figure 13A:
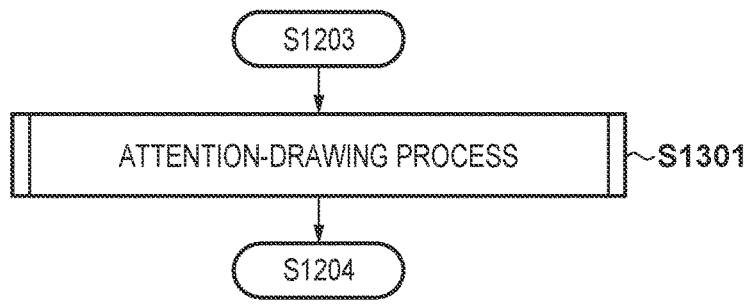
FIGS. 13A and 13B are flowcharts for describing a control process performed by a mobile terminal according to a third embodiment of the present invention.
Figure 13B:
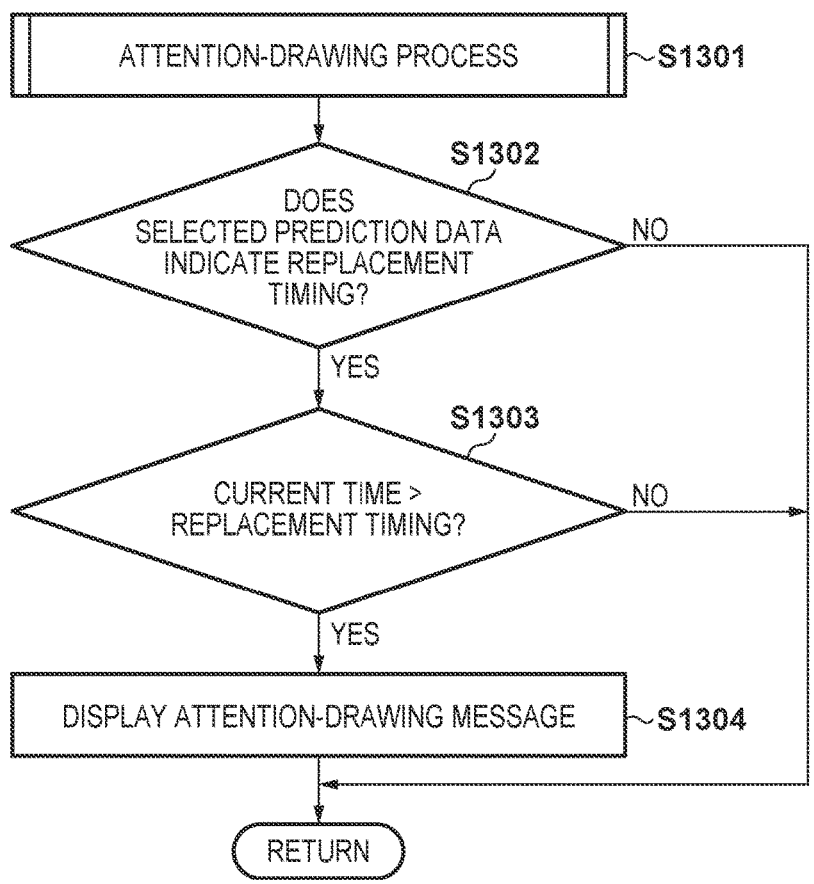

FIGS. 13A and 13B are flowcharts for describing a control process performed by a mobile terminal 105 according to the third embodiment. Note that this process is implemented by the CPU 414 of the mobile terminal 105 executing a program deployed in the RAM 413.

Here, an attention-drawing process (subroutine step S1301) shown in FIG. 13B is inserted between step S1203 and step S1204 in the flowchart of FIG. 12.

When the attention-drawing process of step S1301 is started, the CPU 414 initially functions as the prediction data management module 703 to determine whether or not the prediction data selected in step S1202 indicates a part replacement timing, in step S1302. If the determination result is negative (NO in step S1302), the subroutine is ended. Otherwise (YES in step S1302), the processing proceeds to step S1303. In step S1303, the CPU 414 functions as the prediction data management module 703 to determine whether or not the current time is past the predicted replacement timing. If the determination result is negative (NO in step S1303), the subroutine is ended. Otherwise (YES in step S1303), the processing proceeds to step S1304, in which, for example, an attention-drawing message is displayed on the operation panel 420 as shown in FIG. 10C.

FIG. 10C shows an example display that is provided after at least four minutes have passed since the display of FIG. 10B in the third embodiment, indicating an attention-drawing message that drum replacement indicated in the row 1004 of FIG. 10B has not been performed. In FIG. 10C, in the uppermost row, a message is displayed which indicates that the quality of a print result by the printing apparatus 102 cannot be guaranteed, because a drum replacement operation has not been performed.

Note that, here, when the user has replaced a part, or the current time is past a predicted timing, prediction data indicating operations to replenish the consumable and replace the part are deleted from the screen and no longer displayed.

As described above, according to the third embodiment, the user who continues to use a printing apparatus without replacing a part even when the current time is past a guide timing for part replacement of the printing apparatus can be notified. As a result, the user can know an influence that occurs when part replacement is not performed according to prediction data indicating a replacement timing. Therefore, for example, a situation can be prevented or reduced in which printing is continued while part replacement is forgotten, so that a large amount of defective printed matter is produced.

Fourth Embodiment

In the first and second embodiments, more accurate predicted timings for replenishment or replacement are presented to the user by taking into consideration times (time periods) it takes to replenish consumables or replace parts. However, if the consumption degree of a part does not have sufficient data, the replacement timing prediction module 613 of the information processing apparatus 104 cannot accurately predict a replacement timing, and there may be a significant difference between a predicted timing presented to the user and a timing at which the part is to be actually replaced. With this in mind, in a fourth embodiment, an approximate timing at which it is predicted a part is to be replaced, can be displayed. Note that, in the fourth embodiment, only portions in which it is different from the above embodiments will be described. The same components as those of the above embodiments are indicated by the same reference characters and will not be described. The configuration of a printing system according to the fourth embodiment, the configurations of a printing apparatus, etc., according to the fourth embodiment, the configurations of software modules according to the fourth embodiment, etc., are similar to those of the above embodiments, and therefore, will not be described.

Figure 14A:
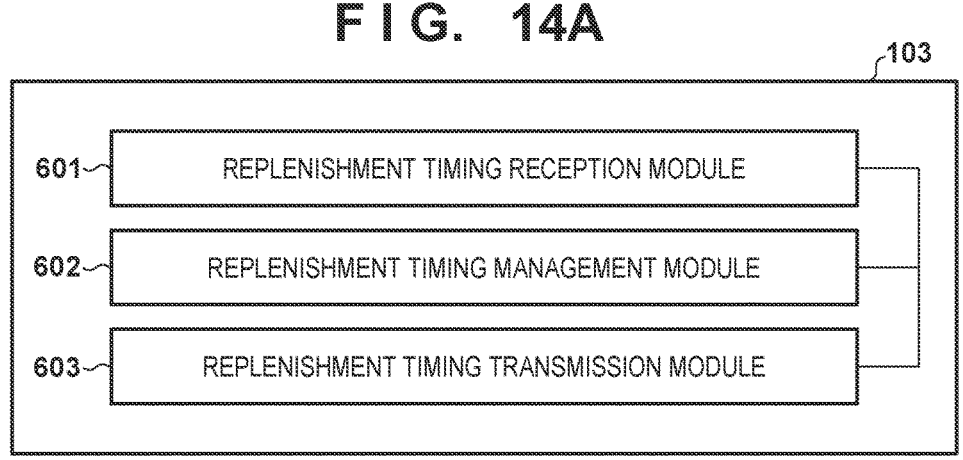
FIGS. 14A and 14B are functional block diagrams for describing software modules of an information processing apparatus according to a fourth embodiment of the present invention.
Figure 14B:
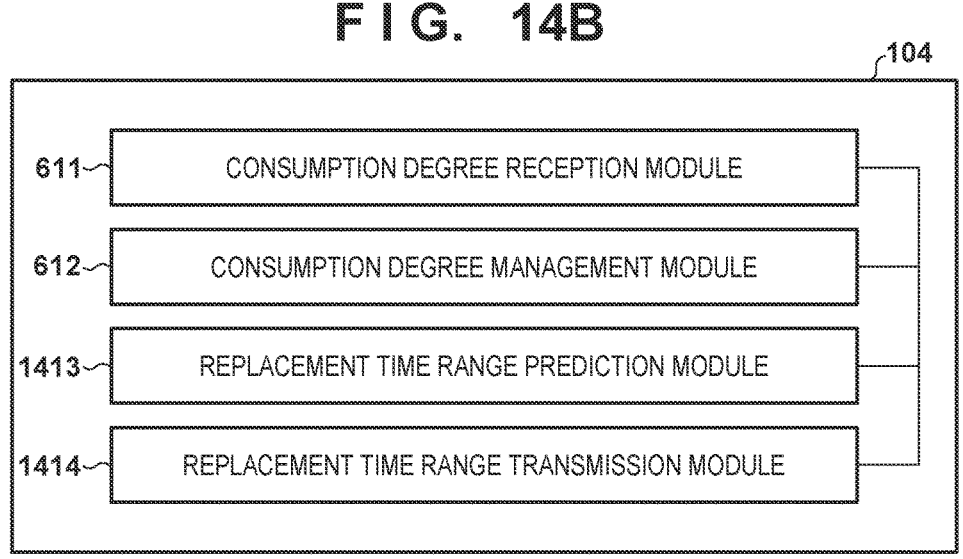

FIGS. 14A and 14B are functional block diagrams for describing software modules of information processing apparatuses 103 and 104, respectively, according to the fourth embodiment of the present invention.

FIG. 14A is a functional block diagram for describing software modules of the information processing apparatus 103 according to the fourth embodiment of the present invention. Note that the functions of these software modules are the same as those of FIG. 6A and therefore will not be described.

FIG. 14B is a functional block diagram for describing software modules of the information processing apparatus 104 according to the fourth embodiment of the present invention. Note that, in FIG. 14B, components similar to those of FIG. 6B are indicated by the same reference characters and will not be described. Note that the functions of these software modules are implemented by a CPU 314 of the information processing apparatus 104 executing a program deployed in a RAM 313.

In FIG. 14B, the configuration described with reference to FIG. 6B is changed in such a manner that the replacement timing prediction module 613 and the replacement timing transmission module 614 are replaced with a replacement time range prediction module 1413 and a replacement time range transmission module 1414. The replacement time range prediction module 1413 statistically processes the consumption degree of the printing apparatus 102 managed by the consumption degree management module 612, to predict an approximate timing at which the consumption degree will reach "100" that is a guide value for part replacement. In the fourth embodiment, the approximate time is defined as a range between an earliest timing at which the consumption degree is likely to reach "100" and a latest timing at which the consumption degree is likely to reach "100" (hereinafter referred to as a "replacement time range"). Thereafter, the replacement time range prediction module 1413 temporarily stores the replacement time range in a storage apparatus, such as the RAM 313, the HDD 315, etc. Each time the replacement time range predicted by the replacement time range prediction module 1413 is updated, the replacement time range transmission module 1414 transmits the updated replacement time range to the mobile terminal 105.

In the fourth embodiment, the prediction data reception module 701, the prediction data queue 702, the prediction data management module 703, the prediction data time-series permutation module 704, and the prediction data display module 706 of the mobile terminal 105 need to be adapted to the replacement time range. Note that it is only necessary to change information handled by each module from the timing to the time range, and the adaptation will not be described.

FIG. 10D is a diagram showing an example screen that is displayed on the operation panel 420 by the prediction data display module 706 according to the fourth embodiment.

In FIG. 10D, the same portions as those of FIG. 10A are indicated by the same reference characters and will not be described. In FIG. 10D, an example is shown in which when the replacement time range prediction module 1413 predicts that the photosensitive drum 251 is to be replaced 4 minutes later at the earliest and 50 minutes later at the latest, the prediction data is displayed in step S809 of FIG. 8. In FIG. 10D, a double-headed arrow 1034 indicates that an operation to replace the photosensitive drum 251 is to be performed 4 minutes later at the earliest and 50 minutes later at the latest.

As described above, according to the fourth embodiment, for example, even if the consumption degree of a part does not have sufficient data, a time range within which a part replacement operation is to be performed can be predicted and displayed. As a result, even if a timing cannot be accurately predicted due to insufficient data of a consumption degree, etc., an approximate timing at which a part replacement operation is to be performed can be presented.

In the above embodiments, it is assumed that consumable replenishment timings or part replacement timings are predicted by the information processing apparatus 104. Alternatively, the present invention is applicable to a case where these predicted timings are input by the user.

In the above embodiments, it is assumed that the mobile terminal 105 receives replenishment timings and replacement timings from the information processing apparatuses 103 and 104, and displays these timings in time series. The present invention is not limited to this. For example, one of the information processing apparatuses 103 and 104, or another information processing apparatus (including a mobile terminal), may execute all of the processes.

The processes executed by the information processing apparatuses 103 and 104 and the mobile terminal 105 in the above embodiments may be executed by the printing apparatus 102 alone.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-194772, filed Sep. 30, 2016, which is hereby incorporated by reference herein in its entirety.

What is claimed is:

1. An information processing apparatus comprising:
a memory device that stores instructions; and
at least one processor that implements the instructions to execute a plurality of tasks, including:
an obtaining task that obtains first prediction data indicating a timing at which a consumable for use in a printing apparatus is to be replenished in the printing apparatus, and second prediction data indicating a timing at which a part of the printing apparatus is to be replaced;

an arranging task that arranges the obtained first and second prediction data in a time sequence on the basis of the timings indicated by the first and second prediction data; and a displaying task that displays the first and second prediction data arranged in a time-sequence, wherein the first prediction data is based at least on:
information of a job being scheduled to be performed by the printing apparatus;
information of a remaining amount of the consumable; and
performance information of processing performance of a printer engine of the printing apparatus.

2. The information processing apparatus according to claim 1, wherein the second prediction data is determined on the basis of a consumption degree of the part that is to be replaced due to a long time use of the printing apparatus.

3. The information processing apparatus according to claim 1, wherein the first and second prediction data are obtained from the printing apparatus.

4. The information processing apparatus according to claim 1, wherein the plurality of task include:
a storing task that stores time information indicating a time duration to replenish the consumable and information indicating a time duration to replace the part; and
a correcting task that corrects the timings indicated by the obtained first prediction data and second prediction data, on the basis of the stored time information,
wherein the arranging task arranges the first and second prediction data indicating the timings corrected by the correcting task in a time sequence on the basis of the corrected timings.

5. The information processing apparatus according to claim 1, wherein the plurality of tasks include notifying task that notifies a user that the current time is past the timing indicated by the obtained second prediction data.

6. The information processing apparatus according to claim 1, wherein the second prediction data indicates the timing at which the part of the printing apparatus is to be replaced, in the form of a time range.

7. The information processing apparatus according to claim 6, wherein the time range is a time range between an earliest timing at which the consumption degree of the part is likely to reach a guide value for replacement of the part, and a latest timing at which the consumption degree of the part is likely to reach the guide value.

8. A method of controlling an information processing apparatus, comprising the steps of:

obtaining first prediction data indicating a timing at which a consumable for use in a printing apparatus is to be replenished in the printing apparatus, and second prediction data indicating a timing at which a part of the printing apparatus is to be replaced;

arranging the obtained first and second prediction data in a time sequence on the basis of the timings indicated by the first and second prediction data; and displaying the first and second prediction data arranged in a time sequence, wherein the first prediction data is based at least on:
information of a job being scheduled to be performed by the printing apparatus;
information of a remaining amount of the consumable; and
performance information of processing performance of a printer engine of the printing apparatus.

9. A non-transitory computer-readable storage medium storing a program executable by a processor to execute a method of controlling an information processing apparatus, the method comprising the steps of:

obtaining first prediction data indicating a timing at which a consumable for use in a printing apparatus is to be replenished in the printing apparatus, and second prediction data indicating a timing at which a part of the printing apparatus is to be replaced;

arranging the obtained first and second prediction data in a time sequence on the basis of the timings indicated by the first and second prediction data; and displaying the first and second prediction data arranged in a time sequence, wherein the first prediction data is based at least on:
information of a job being scheduled to be performed by the printing apparatus;
information of a remaining amount of the consumable; and
performance information of processing performance of a printer engine of the printing apparatus.

* * * * *